United States Patent [19]
Dudas

[11] 4,183,418
[45] Jan. 15, 1980

[54] TRICYCLE APPARATUS

[76] Inventor: Herminia Dudas, Daphne St., No. 7770, Box No. 197, Port Hardy, B.C., Canada, V0N 2P0

[21] Appl. No.: 895,143

[22] Filed: Apr. 10, 1978

[51] Int. Cl.² .................. B60K 1/00; B60K 17/02; B62D 61/08
[52] U.S. Cl. .................. 180/216; 74/664; 180/205; 180/220; 180/65 A; 180/76; 224/31; 280/202; 280/261; 280/282; 280/291; 301/124 R
[58] Field of Search ............. 280/202, 282, 261, 291; 180/25 R, 27, 76, 65 A; 301/124 R; 224/31

[56] References Cited

U.S. PATENT DOCUMENTS

| | | | |
|---|---|---|---|
| 1,178,649 | 4/1916 | Koenig | 280/202 X |
| 1,984,831 | 12/1934 | Higley | 180/65 A |
| 2,311,424 | 2/1943 | Weller | 280/282 X |
| 2,638,797 | 5/1953 | Gross | 74/710.5 |
| 3,592,487 | 7/1971 | Mansperger | 280/282 X |
| 3,598,195 | 8/1971 | Steller | 180/65 A |
| 3,650,344 | 3/1972 | Plessinger | 180/27 |
| 3,705,743 | 12/1972 | Toomey | 296/23 R |
| 3,713,502 | 1/1973 | Delaney | 180/65 A |
| 3,802,598 | 4/1974 | Burger | 280/202 |
| 3,827,705 | 8/1974 | Templeton | 280/261 X |
| 3,833,242 | 9/1974 | Thompson | 280/281 R |

FOREIGN PATENT DOCUMENTS 239365  9/1925  United Kingdom ............ 280/291

*Primary Examiner*—John P. Silverstrim
*Attorney, Agent, or Firm*—Robert D. Farkas

[57] ABSTRACT

A tricycle apparatus utilizes a chassis having a housing disposed surrounding the midregions of the rear axle of the tricycle. Each rear wheel is provided having a child carrying seat secured to a fender-like covering therefor. The rear axle is provided having two portions concentrically aligned with one another and each being locked to each other utilizing a removeable locking pin therefor. In a manual mode of operation, both portions of the rear axle, when locked together, are caused to rotate, operating the rear wheels by the conventional pair of bicycle pedals journaled to the tricycle frame. A double output shafted gear head motor, utilizing a pair of slip clutches is coupled individually to each portion of the rear axle so as to enable a battery, carried by the housing, to operate the motor, provided operating power for the tricycle when such motor, slip clutches and battery are added to a mounting within the housing.

9 Claims, 1 Drawing Figure

TRICYCLE APPARATUS

BACKGROUND OF THE INVENTION

1. The Field of the Invention

This invention relates to tricycle apparatuses and more particularly to that class of device having a housing affixed thereto, equipped with manual and electrically operated propulsion means.

2. Description of the Prior Art

The prior art abounds with tricycles having storage facilities attached thereto. U.S. Pat. No. 3,592,487 issued on July 13, 1971 to R. C. Mansperger teaches a tricycle chassis arranged for ease of operation of the tricycle, quick and easy change of the rear tires, and having a novel basket-and-rear fender assembly that can be quickly attached and removed from the chassis. Such device fails to provide for more than a means of conveyance and a basket which is useful in carrying articles from place to place.

U.S. Pat. No. 3,517,867 issued June 30, 1970 to A. J. Fritz et al. discloses a detachable vinyl coated wire basket mounted on a supporting frame on a tricycle, or the like, with handles attached for carrying the basket and including means for latching or locking the basket on the supporting frame in traveling position, the weight of the basket assisting to maintain the latching means in operative position. The Fritz apparatus does not in any way provide for an enclosure which is secure against the weather nor does it provide for a propulsion means other than the manually applied forces provided by the user, applied to the conventional foot pedal devices, frequently seen on bicycles.

SUMMARY OF THE INVENTION

A primary object of the present invention is to provide a tricycle apparatus suitable for carrying about, in an enclosed fashion, articles stored therewithin.

Another object of the present invention is to provide a tricycle device which may be easily and simply converted from manual operation to electric power operation, by the addition of easily mounted components within the housing portions of the invention.

Still another object of the present invention is to provide a tricycle apparatus having a pair of child carrying seats disposed substantially athwart the position of the driver of the vehicle.

Yet another object of the present invention is to provide a tricycle whose structural components need not be altered when modifying the apparatus from manual propulsion means to electromotive propulsion means.

A further object of the present invention is to provide a housing which is lightweight and may be locked, guaranteeing the integrity and security of articles stored therewithin.

Another object of the present invention is to provide lightweight, inexpensive and durable means of transportation for personnel and articles.

Many households require motor vehicles for purposes of transporting articles and members of the household from place to place. Such vehicles are expensive and consume valuable energy forms, such as hydrocarbons. The expense of operation, coupled with the expense of acquisition, is often prohibitive to young family members. The present invention recognizes the need for an inexpensive and simple vehicle which may be operated manually or automatically depending upon the affluence of the owners and depending upon the distance which such vehicle is required to travel. Furthermore, such device is often required for purposes of transporting infant children from place to place, under the supervision of an adult member of the family. The present invention recognizes these needs and provides a solution for some by utilizing a totally effective mode of transportation, such as a bicycle, in tricycle form, having a storage-like housing secured about portions of the rear axle of the apparatus. Such rear axle may be operated in conventional fashion, utilizing the foot pedal portion of the apparatus manually operated by the adult member when seated on the centrally disposed seat secured to the frame portion of the apparatus. Such housing is provided having a lid which is lockable, both being fabricated from a lightweight yet durable material, such as fiberglass. Because the rear axle is fabricated from two coaxially aligned shaft-like members, each being separable from one another, utilizing a locking pin extending transverse to the longitudinal axis thereof, a motor device may be mounted within the housing, coupled to each of the separately rotatable output shafts. A battery provides operating power for the motor. Controls of the conventional variety are disposed mounted to the handle portion of the tricycle for operating the motor in forward and reverse condition. Since two shafts are employed, each utilizing a separate slip clutch to engage the output shafts of the gear head motor, each rear wheel may turn independently of one another facilitating cornering speed requirements for the separate acting rear wheels. The child carrying seats, disposed on the fenders covering the rear wheels, are located substantially adjacent to and aligned with the adult operator of the vehicle, thereby enhancing supervision and enjoyment of the users of the apparatus.

These objects as well as other objects of the present invention will become more readily apparent after reading the following description of the accompanying drawings.

DESCRIPTION OF THE PREFERRED EMBODIMENT

Figure 1:
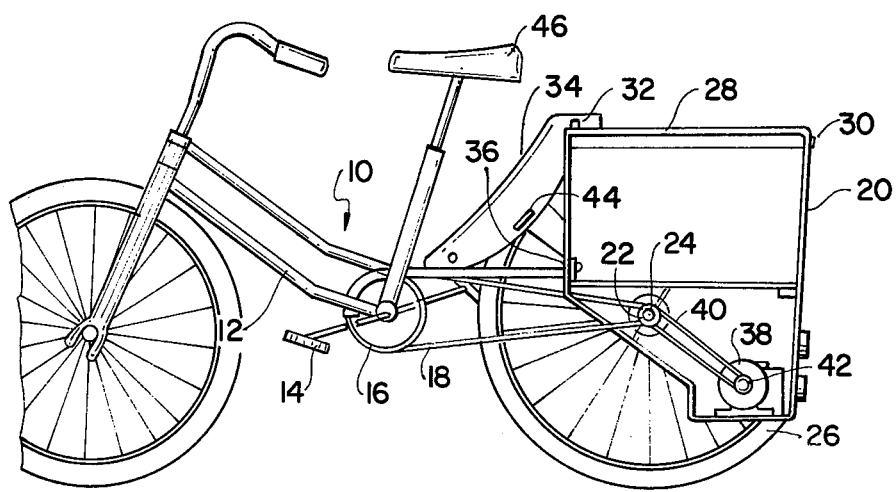
FIG. 1 is a side elevation view of a portion of the present invention.

The structure and method of fabrication of the present invention is applicable to a tricycle having a front wheel portion and a frame carrying the front wheel. The rear portion of the frame is secured to a housing, preferably fabricated from a fiberglass material. Such housing is provided with an open mouth portion to which a cover, also fabricated preferably from fiberglass, is hingeably secured and may be lockably retained in a closed position, employing a lock therefor. Each of the side rear wheels extends outwardly from opposed sides of the housing, utilizing an axle which passes through the housing. The axle is composed of two members, each being in rod-like form, and each being coaxially aligned. One of the axles is provided having a cylindrical opening in which a portion of the other axle resides. A pin is removably insertable into holes disposed in both axles such that both axles may be locked together, causing them to rotate simultaneously in bearings which mount the axles to the interior portion of the housing. When the pin is removed, each of the rear wheels may rotate independently of one another. One of the axles carries a sprocket thereon. Such sprocket is coupled to the sprocket carrying the foot pedals that is journaled to the frame and located somewhat below and slightly forward from the central seat disposed carried by the frame. Thus, manually operating the foot pedals causes such axle portion to rotate, causing the wheel carried by same to rotate therewith. When the other wheels axle portion is joined to the axle portion carrying the sprocket, both wheels rotate together. A pair of individual child-like seats, as taught by U.S. Pat. No. 3,802,598 issued Apr. 9, 1974 to I. E. Burger et al. are secured to the fender-like portions of the apparatus disposed covering the uppermost regions of each of the rear wheels. Such child carriers are positioned so as to be substantially aligned along a line extending transverse to the longitudinal axis of the tricycle and such line substantially intersects the location of the central seat occupied by the adult user of the apparatus. In this form, the present invention is totally manually operable, and inexpensive in its use. The rear surface of the housing may be provided with reflectors, and, if desired, a license platelike tag illustrating the name of the owner.

When the family requires the use of same, an electrically operated motor may be disposed mounted within the housing, provided with a pair of output shafts, each operating at substantially lower rotational speeds than the armature of such motor, utilizing separate gear heads therefor. Each output shaft is provided having a slip clutch mounted thereto. Each slip clutch is in turn coupled to an individual portion of the rear axle of the apparatus, utilizing a pair of sprockets or pulleys therefor, in conjunction with a pair of endless bicycle chains or V-belts, respectively. Thus, when the motor operates, each axle portion is rotated at a simultaneous speed. When one of wheels encounters an obstacle or, more importantly, when the tricycle is turned, so as to move along a curve, one of the rear wheels is free to rotate at a different speed than the other, due to the individual action of the slip clutches and due to the fact that the pin, utilized to couple together the individual rear axle portions, has been removed. Each axle portion, being separately journaled to the housing, need not be disturbed when the pin is removed. Thus, the structural portions of the tricycle need not be modified in any way when the motor apparatus is added to the construction. The motor is operated by a conventional solid-state motor control, well known in the art, and preferably installed in the armature portion of a shunt wound direct current motor. An operating switch is disposed in series with the motor terminals and coupled to a battery, also installed within the housing. The terminals of the battery are coupled to a receptacle disposed on a rearmost surface of the housing, permitting the battery to be recharged utilizing an external charging source therefor. Dynamic braking may be employed, if desired. Running lights and signal lights may be provided exposed on the rearmost surface of the vehicle, utilizing separate operating switches therefor and a flasher, if desired. A license plate may be added to the present invention, if required by local ordinances.

Now referring to the figures, and more particularly to the embodiment illustrated in FIG. 1 showing the present invention 10 comprising a tricycle frame 12 having a foot pedal 14 coupled to sprocket 16. Bicycle chain 18 is shown entering housing 20 and is coupled to sprocket 22 carried by shaft 24. Rear wheel 26 is shown mounted coaxially aligned with shaft 24. Lid 28 utilizes hinges 30 to secure it to housing 20. Lock 32 is employed securing lid 28 to housing 20. Child carrier 34 is shown secured to rear fender 36, covering rear wheel 26. Electric motor 38, utilizes bicycle chain 40 to couple same to shaft 42. Opening 44, in seat 34, is utilized for purposes of securing a strap, not shown, thereto, so as to hold securely a child, not shown, therein. Seat 46 is disposed mounted above and slightly behind wheel 16.

Figure 2:
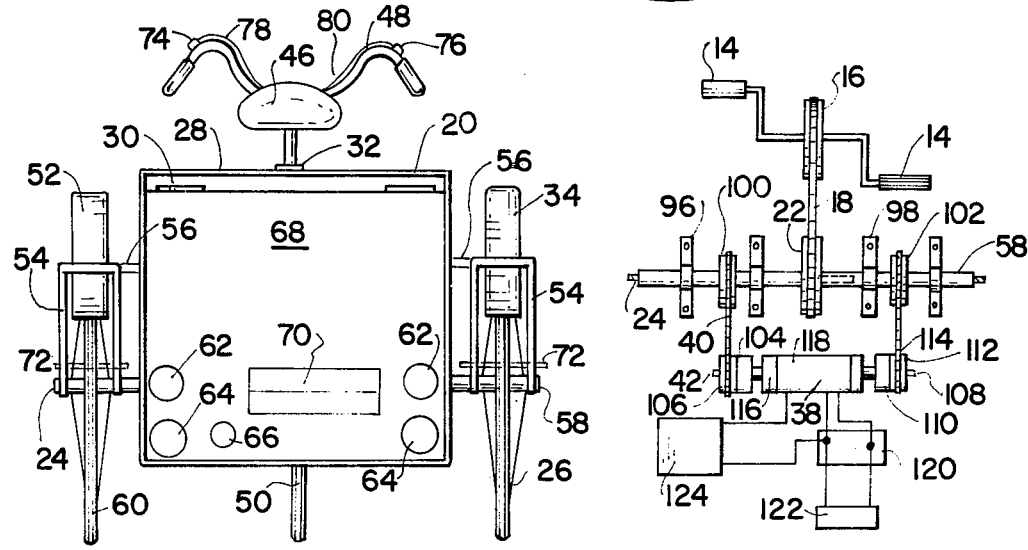
FIG. 2 is a rear elevation view of the present invention.

FIG. 2 illustrates handlebars 48 shown partially concealed by seat 46. Front wheel 50 is shown behind housing 20. Carrier 52, equivalent in construction to carrier 34, is shown secured to yoke portion 54. Bar 56 secures yoke portions 54 to housing 20, preventing the rotation thereof about axles 24 and 58, each emerging from opposed side walls of housing 20. Wheel 60 is carried by axle 24. Wheel 26 is carried by axle 58. Rear reflectors 62, rear signal light housings 64 and receptacle cover 66 are carried on rearmost surface 68, of housing 20. License plate 70 is secured to surface 68. Foot supporting bars 72 are secured to yoke members 54, for use in supporting the foot of a child, not shown, when seated in seats 34 and 52. Electrical controls 74 and 76, utilize wires 78 and 80 respectively, to couple the electrical components of the present invention together.

Figure 3:
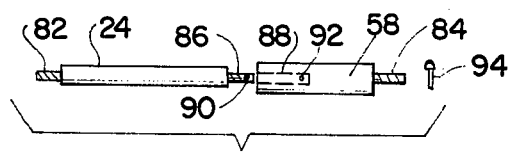
FIG. 3 is a plan view of a portion of the present invention.

FIG. 3 illustrates rear axle shafts 24 and 58 shown in disassembled condition. Threaded portion 82 is useful in securing rear wheel 60, shown in FIG. 2, to axle rod 24. Threaded portion 84 is useful in securing rear wheel 60, shown in FIG. 2, to axle rod 58. Cylindrically shaped portion 86, of axle 24, is adapted to reside in an opening, shown in dotted lines 88, in axle 58, such that axles 24 and 58 are coaxially aligned when assembled together. Hole 90 and hole 92, each being located in axles 24 and 58 respectively, utilize pin 94 to assemble axle rods 24 and 58 together into one shaft-like assembly wherein the outermost surface of axle 58 is somewhat larger in diameter than the outermost surface of axle 24.

Figure 4:
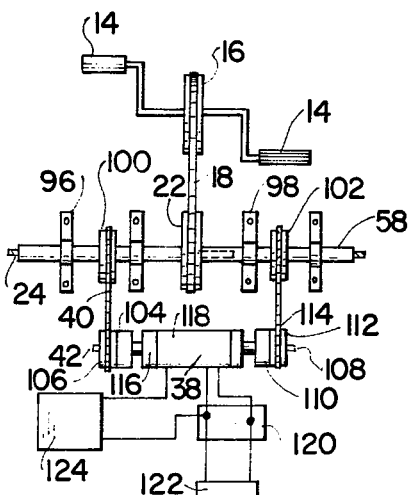
FIG. 4 is a plan view of a portion of the present invention shown having additional components added thereto.

FIG. 4 illustrates axle 24 and 58 in aligned condition having sprocket 22 secured to axle 24 immediately adjacent the location of the end of axle 58. Pin 94, shown in FIG. 3, has been removed, thereby allowing axles 24 and 58 to rotate independently of one another. Bearings 96 journal axle 24 to housing 20, shown in FIG. 1. Bearings 98 journal axle 58 to housing 20, shown in FIG. 1. Sprocket 100 is carried by shaft 24. Sprocket 102 is carried by shaft 58. Shaft 42, of motor 38, carried slip clutch 104. Slip clutch 104 carries sprocket 106, shown supporting bicycle chain 40. Shaft 108, of motor 38, carries slip clutch 110, slip clutch 110 carries sprocket 112, which in turn carries bicycle chain 114. Bicycle chain 114 is carried by sprocket 102, secured to axle 58. Gear housings 116 and 118 are each carried by motor 38 and each have shafts 42 and 108 respectively extending outwardly therefrom, rotating at a slower speed than the armature of motor 38, not shown. Battery 120 is shown coupled to receptacle 122 and to controller 124. Controller 124 is utilized to operate motor 38 in any desired speed, in conventional fashion.

Figure 5:
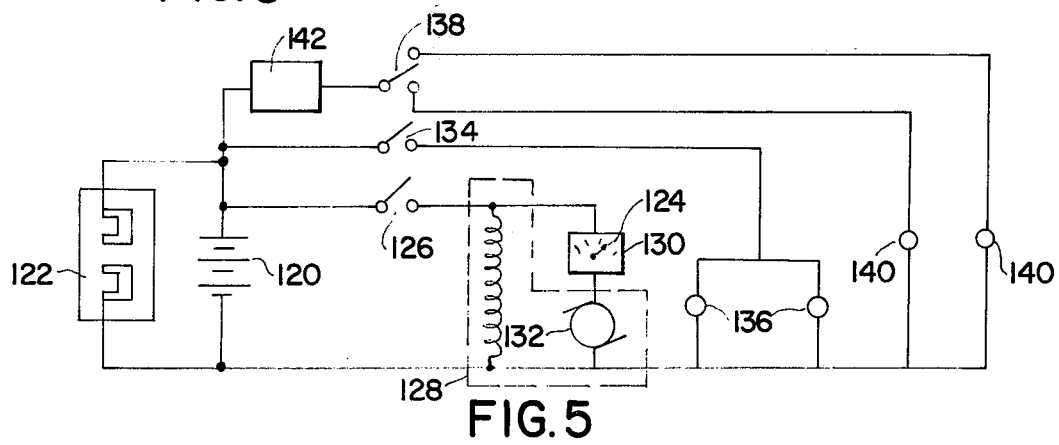
FIG. 5 is an electrical schematic diagram of the devices shown in FIG. 4.

FIG. 5 illustrates schematic interconnection of the various electrical components of the present invention in which battery 120 is electrically coupled to receptacle 122 directly, having one terminal thereof at chassis ground. Switch 126, illustrated as one of the controls shown as numerals 74 and 76, of FIG. 2, controls the flow of electrical energy to motor 38, shown in FIG. 4, and depicted herein by dotted lines 128. Controller 124 is provided having a control knob 130, for varying the intensity of the current flowing to armature 132, in a conventional manner. Switch 134 operates signal lamps 136, disposed mounted within housing 64, shown in FIG. 2. Switch 134 may be a portion of controls 74 and 76, shown in FIG. 2. Switch 138 selectively operates left hand and right hand signal lamps 140 when thrown in either position. Flasher 142 causes lamps 140 to operate intermittently by interrupting a current flow from battery 120. Turn signal lamps 140 may be disposed in housing 64, shown in FIG. 2. Switch 138 may form part of controls 74 and 76, shown in FIG. 2.

One of the advantages of the present invention is a tricycle apparatus suitable for carrying about, in an enclosed fashion, articles stored therewithin.

Another advantage of the present invention is a tricycle device which may be easily and simply converted from manual operation to electric power operation, by the addition of easily mounted components within the housing portions of the invention.

Still another advantage of the present invention is a tricycle apparatus having a pair of child carrying seats disposed substantially athwart the position of the driver of the vehicle.

Yet another advantage of the present invention is a tricycle whose structural components need not be altered when modifying the apparatus from manual propulsion means to electromotive propulsion means.

A further advantage of the present invention is a housing which is lightweight and may be locked, guaranteeing the integrity and security of articles stored therewithin.

Another advantage of the present invention is a lightweight, inexpensive and durable means of transportation for personnel and articles.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A tricycle apparatus comprising a tricycle frame having a pair of foot pedals, said foot pedals secured to a first sprocket, said first sprocket rotatably secured to said tricycle frame, a pair of axles, one of said paid of axles carrying a second sprocket, said second sprocket coupled to said first sprocket, a housing, said housing fixedly secured to said frame, said housing rotatably supporting said pair of axles, a wheel secured to each of said pair of axles, means to releasably lock said pair of axles together against separate rotation, a third sprocket, a fourth sprocket, said third sprocket carried by said one of said pair of axles, said fourth sprocket carried by the other of said pair of axles, an electric motor, said electric motor having two output shafts, a pair of slip clutches, said pair of slip clutches mounted separately to said two output shafts, a fifth sprocket and a sixth sprocket, said fifth sprocket carried by one of said pair of slip clutches, said sixth sprocket being carried by the other of said pair of slip clutches, a pair of bicycle chains, one of said pair of bicycle chains coupling said third sprocket to said fifth sprocket, the other of said bicycle chains coupling said fourth sprocket to said sixth sprocket, said electric motor being mounted within said housing, a battery, said battery being mounted within said housing, said battery coupled to said electric motor, a controller, said controller electrically coupled to said electric motor and said battery.

2. The apparatus as claimed in claim 1 wherein said means to releasably lock said pair of axles against separate rotation comprises a pin, each of said pair of axles having a hole passing therethrough and extending transverse to the longitudinal axes thereof, said pin being removeably secured within said hole.

3. The apparatus as claimed in claim 1 wherein each of said pair of axles are individually journaled to said housing.

4. The apparatus as claimed in claim 1 further comprising a receptacle, said receptacle electrically coupled to said battery, said receptacle secured to said housing.

5. The apparatus as claimed in claim 1 further comprising a first pair of signal lamps, said first pair of signal lamps secured to said housing, a first operating switch, said first operating switch electrically coupled to said first pair of signal lamps, said first pair of signal lamps being disposed in a parallel electrical circuit, said first operating switch and said first pair of signal lamps and said battery being disposed in a series electrical circuit.

6. The apparatus as claimed in claim 1 further comprising a flasher, a second operating switch, a second pair of signal lamps, said second pair of signal lamps secured to said housing, said second operating switch having a single pole double throw configuration including a moveable contact arm and a pair of stationary contacts, each of said second pair of signal lamps coupled to said stationary contacts, said flasher coupled to said contact arm, said flasher and said second operating switch and said second pair of signal lamps and said battery disposed in a series electrical circuit.

7. The apparatus as claimed in claim 1 wherein said housing comprises fiberglass and a pair of child supporting seats carried by said housing and located adjacent each free end of said pair of axles.

8. The apparatus as claimed in claim 7 further comprising a yoke, said yoke carried by said housing and mounted externally thereto, said child supporting seat secured to said yoke.

9. The apparatus as claimed in claim 8 further comprising at least one foot supporting rod, one end of said foot supporting rod being secured to said yoke.

* * * * *